United States Patent
Anderson

(10) Patent No.: US 7,620,367 B2
(45) Date of Patent: Nov. 17, 2009

(54) FREQUENCY DOMAIN UNSCHEDULED TRANSMISSION IN A TDD WIRELESS COMMUNICATIONS SYSTEM

(75) Inventor: Nicholas William Anderson, Bristol (GB)

(73) Assignee: IPWireless, Inc., San Francisco, CA (US)

( * ) Notice: Subject to any disclaimer, the term of this patent is extended or adjusted under 35 U.S.C. 154(b) by 452 days.

(21) Appl. No.: 11/263,044

(22) Filed: Oct. 31, 2005

(65) Prior Publication Data

US 2007/0097928 A1    May 3, 2007

(51) Int. Cl.
*H04B 1/00*    (2006.01)
*H04B 15/00*    (2006.01)
*H04J 11/00*    (2006.01)
*H04B 7/216*    (2006.01)

(52) U.S. Cl. .................. 455/63.1; 370/210; 370/335

(58) Field of Classification Search ............... 455/63.1; 370/210, 335
See application file for complete search history.

(56) References Cited

U.S. PATENT DOCUMENTS

| 6,909,879 B1* | 6/2005 | Centore, III | 455/63.1 |
| 2007/0097928 A1* | 5/2007 | Anderson | 370/335 |
| 2007/0242600 A1* | 10/2007 | Li et al. | 370/210 |

FOREIGN PATENT DOCUMENTS

WO    WO-02/093779 A2    11/2002

OTHER PUBLICATIONS

International Search Report mailed Mar. 12, 2007, for PCT Application No. PCT/EP2006/067644 filed Oct. 20, 2006, 3 pages.

Jeong, I. et al. (Dec. 1999). "A TDD-CDMA System with Pre-Phase Subcarrier Equalizer Using Asymmetric Modulation Scheme in Duplex Channel," Global Telecommunications Conference, GLOBECO '99. 1A:122-126.

Xue, Y. et al. (Jun. 2004). "Pursuing Multiuser Diversity in an OFDM System with Decentralized Channel State Information," 2004 IEEE International Conference on Communications 6:3299-3303.

3rd Generation Partnership Project, Technical Specification Group Services and System Aspects, Technical Specifications and Technical Reports for a UTRAN-based 3GPP system, (Release 6) 3GPP TS 21.101 V6.2.0 (Jun. 2005).

3rd Generation Partnership Project, Technical Specification Group Services and System Aspects, Evolution of 3GPP System, (Release 6) 3GPP TR 21.902 V6.0.0 (Sep. 2003).

3rd Generation Partnership Project, Technical Specification Group Services and Systems Aspects, Network Architecture (Release 6) 3GPP TS 23.002 V6.8.0 (Jun. 2005).

(Continued)

*Primary Examiner*—William D Cumming
(74) *Attorney, Agent, or Firm*—Fitch Even Tabin & Flannery

(57) ABSTRACT

An apparatus and method exploits a variable frequency response of a radio channel in a time division duplex wireless communication system such that for unscheduled uplink transmissions, the transmission power required for correct reception of the data is minimized. The degree of interference caused to other users in both the serving cell and the neighbor cells is correspondingly reduced and hence system capacity is improved.

23 Claims, 18 Drawing Sheets

OTHER PUBLICATIONS

3rd Generation Partnership Project, Technical Specification Group Radio Access Network, User Equipment (UE) radio transmission and reception (FDD) (Release 6) 3GPP TS 25.101 V6.8.0 (Jun. 2005).

3rd Generation Partnership Project, Technical Specification Group Radio Access Network, User Equipment (UE) radio transmission and reception (TDD) (Release 6) 3GPP TS 25.102 V6.1.0 (Jun. 2005).

3rd Generation Partnership Project, Technical Specification Group Radio Access Network, Base Station (BS) radio transmission and reception (FDD) (Release 6) 3GPP TS 25.104 V6.9.0 (Jun. 2005).

3rd Generation Partnership Project, Technical Specification Group Radio Access Network, Base Station (BS) radio transmission and reception (TDD) (Release 6) 3GPP TS 25.105 V6.2.0 (Dec. 2004).

3rd Generation Partnership Project, Technical Specification Group Radio Access Network, Physical channels and mapping of transport channels onto physical channels (FDD) (Release 6), 3GPP TS 25.211 V6.5.0 (Jun. 2005).

3rd Generation Partnership Project, Technical Specification Group Radio Access Network, Multiplexing and channel coding (FDD) (Release 6), 3GPP TS 25.212 V6.5.0 (Jun. 2005).

3rd Generation Partnership Project, Technical Specification Group Radio Access Network, Physical layer procedures (FDD) (Release 6) 3GPP TS 25.214 V6.6.0 (Jun. 2005).

3rd Generation Partnership Project, Technical Specification Group Radio Access Network, Physical layer—Measurements (FDD) (Release 6) 3GPP TS 25.215 V6.3.0 (Jun. 2005).

3rd Generation Partnership Project, Technical Specification Group Radio Access Network, Physical channels and mapping of transport channels onto physical channels (TDD) (Release 6) 3GPP TS 25.221 V6.4.1 (Jun. 2005).

3rd Generation Partnership Project, Technical Specification Group Radio Access Network, Multiplexing and channel coding (TDD) (Release 6 ) 3GPP TS 25.222 V6.2.0 (Dec. 2004).

3rd Generation Partnership Project, Technical Specification Group Radio Access Network, Spreading and modulation (TDD) (Release 6) 3GPP TS 25.223 V6.0.0 (Dec. 2003).

3rd Generation Partnership Project, Technical Specification Group Radio Access Network, Physical layer procedures (TDD) (Release 6) 3GPP TS 25.224 V6.5.0 (Jun. 2005).

3rd Generation Partnership Project, Technical Specification Group Radio Access Network, Physical layer, Measurements (TDD) (Release 6) 3GPP TS 25.225 V6.1.0 (Mar. 2004).

3rd Generation Partnership Project, Technical Specification Group Radio Access Network, FDD Enhanced Uplink, Overall description, Stage 2 (Release 6) 3GPP TS 25.309 V6.3.0 (Jun. 2005).

3rd Generation Partnership Project, Technical Specification Group Radio Access Network, Feasibility Study on Uplink Enhancements for UTRA TDD (Release 6) 3GPP TR 25.804 V2.0.0 (Feb. 2005).

3rd Generation Partnership Project, Technical Specification Group Radio Access Network, FDD Enhanced Uplink, Physical Layer Aspects (Release 6) 3GPP TR 25.808 V2.0.0 (Mar. 2005).

3rd Generation Partnership Project, Technical Specification Group Radio Access Network, Physical layer aspects of UTRA High Speed Downlink Packet Access (Release 4) 3GPP TR 25.848 V4.0.0 (Mar. 2001).

3rd Generation Partnership Project, Technical Specification Group Radio Access Network, Feasibility Study considering the viable deployment of UTRA in additional and diverse spectrum arrangements (Release 6) 3GPP TR 25.889 V6.0.0 (Jun. 2003).

3rd Generation Partnership Project, Technical Specification Group Radio Access Network, Feasibility Study for Enhanced Uplink for UTRA FDD (Release 6) 3GPP TR 25.896 V6.0.0 (Mar. 2004).

* cited by examiner

FREQUENCY DOMAIN UNSCHEDULED TRANSMISSION IN A TDD WIRELESS COMMUNICATIONS SYSTEM

TECHNICAL FIELD

The present invention relates to wireless communication systems, and in particular to time division duplex (TDD) wireless communication systems in which uplink and downlink communication channels possess a degree of correlation so that a received downlink transmission received by a mobile station indicates an uplink path loss, to indicate a set of preferred uplink transmission frequencies.

BACKGROUND ART

In wireless communications systems there is often the need for uplink random access transmissions from the mobile station (or user equipment—UE) and the basestation (often referred to as Node-B in for example 3GPP specifications).

The need to make a random access transmission from the mobile may arise due to various situations and will also differ according to the particular system and system design. Examples of situations in which random access may be required include:
- a mobile terminal makes an initial access attempt to connect to the system via a random access uplink transmission
- a mobile terminal signals a request to change serving base station via a random access uplink transmission
- a mobile terminal signals the network with a request for a scheduled uplink resource, responsive to the arrival of data in the mobile's transmission buffer using a random access transmission
- a mobile terminal transmits data to a base station using a random access uplink transmission responsive to the arrival of the data in the mobile's transmission buffer (this can reduce the transmission latency of the data compared to the situation immediately above in which the mobile must wait for the network to respond with an explicit grant of uplink resources for the data)

Random access transmissions may similarly be referred to as unscheduled transmissions, as no explicit scheduling or coordination of the transmissions is carried out. Due to this lack of explicit coordination, there exists a probability that one mobile will transmit using the same uplink transmission resources as another user. In this instance, the communication reliability of both transmissions may be compromised due to the mutual interference they generate for each other at their basestation receivers. These cases in which more than one mobile simultaneously transmits on a defined set of uplink resources, are sometimes referred to as "collisions".

FIG. 1A shows an example of scheduled transmissions and FIG. 1B shows an example of unscheduled transmissions. Both apply to a pure time-division multiple access (TDMA) system. In the case of scheduled transmissions (FIG. 1a), a network scheduler ensures that more than one UE does not transmit in the same timeslot. In the unscheduled case (FIG. 1b), the network scheduler cannot explicitly control the times at which the UEs transmit and it is possible that more than one UE transmits at the same time, leading to collisions (1a, 1b, and 1c).

In some systems, simultaneous transmission does not necessarily imply a collision. This is because such systems can employ some other form of multiple access in addition to TDMA. A time period or timeslot in a TDMA system can be further subdivided into one or more other domains, such as frequency or code. Simultaneously-transmitting users may then still be distinguished from one another by means of the frequencies or codes they use, so long as they select mutually exclusive code or frequency resources during the time interval. This subdivision of each time resource into multiple code or frequency components increases the number of uplink resource units available in the system (although often reducing the information carrying capabilities per resource unit), and hence the number of random access channels may be increased.

Systems in which transmission resources are divided in the frequency domain are referred to as Frequency Division Multiple Access systems (FDMA). Systems in which transmission resources are divided in the code domain are referred to as Code Division Multiple Access systems (CDMA).

Within such systems, collisions are however still possible, in the case that two or more UE's autonomously select the same time and code/frequency resources when making unscheduled transmissions. This situation is shown as 21 in FIG. 2 for the TDMA/CDMA case, although it is equally applicable to the TDMA/FDMA case by replacement of the code-domain y-axis with a "frequency" y-axis.

The possibility for collisions to occur will always be present when the uplink transmissions are not explicitly scheduled or coordinated (for example by the network). However, some forms of statistical scheduling may be used wherein signaling is transmitted from the network to the mobiles restricting the allowed probability of transmission. The signaling usually indicates an allowable transmission probability, or a related parameter. When there is excessive utilization (loading) of the uplink random access or non-scheduled resources, the network will detect this and will reduce the allowable transmission probability. Conversely, when the load is reduced, the allowable transmission probability signaled may be increased. Thus, at high loads, the resources are still usable, but the users may have to wait some time before being allowed to transmit, whereas at low loads, users can transmit with typically less delay.

Such statistical scheduling is unable to avoid transmission collisions, but it can be used to prevent the resources from becoming overloaded and hence unusable to any users (i.e. when the collision probability approaches 100%).

In addition to random access transmissions suffering from intra-cell interference and collisions (arising from transmissions from users within the same cell), in a cellular system, they also suffer from inter-cell interference (arising from transmissions from users in neighboring or adjacent cells). Referring to FIG. 3, mobile station 35 is transmitting to desired base station 38 via transmission path 31a, but at the same time interferes with base station 37 through transmission path 32a. Likewise, mobile station 36 is transmitting to desired base station 37 via transmission path 31b, but at the same time interferes with base station 38 through transmission path 32b. This is especially true in networks employing a so-called frequency reuse of 1 (i.e. all cells sharing the same carrier frequency). Modern-day cellular communication systems often utilize this frequency reuse of 1 as they are able to offer high capacity and spectrally efficient deployments.

The degree by which one transmission interferes with another generally varies according to the relative powers of the transmissions as observed by the receiver at the basestation. Other factors may also come into play concerning the particular waveforms used and their properties, but the general principle holds that if the power of an interfering signal is reduced at a receiver, then the probability of that signal preventing correct detection of another signal is also reduced.

The power of a transmission at a serving cell receiver is usually controlled such that it arrives with only just enough received power to enable successful decoding (i.e. low error rate detection) of the transmitted data. The use of excessive power can result in excessive interference to other transmissions, whereas the use of an insufficient power can result in erroneous detection.

It is thus clear that when considering densely-planned cellular networks (often with frequency reuse of 1), that there is a need to minimize the transmission power of random access transmissions while maintaining an acceptable reliability of communication. By minimizing the transmitted power for a given successful transmission, the amount of interference observed in the serving and neighbor cells is correspondingly reduced and system capacity is therefore increased.

Systems in existence today already use a similar concept. For example, in the 3GPP TDD-CDMA system, the mobile estimates the path loss from the serving basestation to the mobile by measuring the received signal strength of a so-called beacon channel. The mobile is also signaled information regarding the transmission power of the beacon signal. Using the two pieces of information (the transmission power and received power), the mobile is then able to determine the signal strength loss in the radio channel (path loss). The mobile can then use this information to set the transmission power to achieve a certain target power level at which the signal will be received at the basestation.

Recent times have seen increasing interest in frequency domain multiple access (FDMA) and related modulation techniques (e.g. Orthogonal Frequency Division Multiple Access—"OFDM" and Discrete Fourier Transform Spread OFDM—"DFT-SOFDM"). In these systems, transmitted information may be targeted at an occupation of a certain range of frequencies (i.e. sub-ranges) within an overall system bandwidth, or at a certain set of discrete frequencies or "tones" across the band.

In FDMA a range of frequencies is typically allocated to a system. This range of frequencies is then subdivided into sub-ranges of frequencies, comprising individual frequency channels. The case in which a transmission of data from a user is mapped to a contiguous set of sub-ranges of frequencies is often referred to as localized FDMA as illustrated in FIG. 4A. Correspondingly, the case in which transmission of data from a user is mapped to a noncontiguous set of sub-ranges of frequencies is referred to as distributed FDMA as illustrated in FIG. 4B.

Distributed FDMA may also be combined with a TDMA component to form a 2 dimensional resource space or time-frequency grid, as illustrated in FIG. 5A. Localized FDMA may also be combined with a TDMA component to form a 2 dimensional resource space or time-frequency grid, as illustrated in FIG. 5B.

SUMMARY OF THE INVENTION

Embodiments of the present invention estimate a variable frequency response of a radio channel for unscheduled transmissions to minimize the transmission power required for reception by a receiver (such as a base station) at an acceptable error rate. The degree of interference caused to other users in both the serving cell and neighboring cells can be correspondingly reduced and hence system capacity is improved.

According to one embodiment of the invention, there is provided a method of selecting, by a mobile terminal in a TDD wireless communication system, an uplink transmission resource from a plurality of uplink transmission resources, comprising: receiving a downlink reference signal that has been transmitted over a range of frequencies, spanning a plurality of sub-ranges of frequencies representing uplink transmission resources, the downlink reference signal having a known structure as transmitted (note: the downlink reference signal does not need to exist on the exact uplink transmission resources—so long as they span the required range, interpolation in the frequency domain can be used to derive the response on the exact uplink resource frequencies); determining a frequency domain response of the radio channel through which the reference signal has passed by comparing the received downlink reference signal with the known structure of the reference signal as transmitted; calculating a path loss metric for at least one of the sub-ranges of frequencies based on the frequency domain response of the radio channel; and selecting at least one of the sub-ranges of frequencies for uplink transmission, based on the at least one path loss metric.

Another embodiment further comprises transmitting an unscheduled uplink transmission in the at least one of the sub-ranges of frequencies.

In a further embodiment, a received downlink reference signal is received within a channel coherence time of the transmitted unscheduled uplink transmission.

In an additional embodiment, the frequency domain response of the radio channel through which the reference signal has passed is determined using a Fourier Transform of an impulse response of the radio channel as determined from a deconvolution of the received reference signal and the transmitted reference signal, or by other suitable processing of the received and transmitted reference signals, such as matched filtering or correlation with optional post-processing as are well known to one of ordinary skill in the art. In yet another embodiment, the frequency domain response of the radio channel through which the reference signal has passed is determined by comparing a power spectral density of the reference signal as received with a known power spectral density of the reference signal as transmitted. In still further embodiments, "blind" channel estimation techniques can be used to estimate channel impulse or frequency response.

Other embodiments, further comprise adjusting the unscheduled uplink transmission power based on the at least one path loss metric.

Another embodiment estimates an absolute radio channel path loss value for at least one sub-range of the frequencies, comprising measuring a received reference signal power level within the at least one sub-range of frequencies, having a known transmission power level, to estimate a radio channel path loss; and sets a transmission power level for the unscheduled uplink transmission based upon the estimated radio channel path loss over the sub-range of frequencies.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

DETAILED DESCRIPTION OF THE INVENTION

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

Some portions of the detailed description which follows are presented in terms of procedures, steps, logic blocks, processing, and other symbolic representations of operations on data bits that can be performed on computer memory. A procedure, computer executed step, logic block, process, etc., are here conceived to be a self-consistent sequence of steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Several embodiments of the invention are described below. These embodiments are described with reference to 3GPP UTRA TDD systems, specifications and recommendations, but are applicable more generally.

The invention is of particular relevance to time-division-duplex (TDD) radio systems in which uplink and downlink channel propagation characteristics are substantially correlated (reciprocal) over a given time frame. Reciprocal channels are those in which the physical characteristics of the radio propagation channel used for communication from the basestation to the mobile are substantially the same as those used for communication from the mobile to the basestation. The reciprocal nature of the channel applies over a limited interval of time, sometimes called a "channel coherence time." If the channel changes significantly between the time at which the channel is used for one radio link direction and the time it is used for the other link direction, then the reciprocity of the channel cannot be exploited. Changes in the channel path loss can arise due to the phenomenon known as "fast fading" or "frequency selective fading". This occurs due to the constructive and destructive summation of multiple, time-delayed copies of a received transmitted signal. This translates to a time domain variation as the mobile receiver moves through this spatial interference pattern or as objects causing the signal reflections and delays move.

Figure 1A:
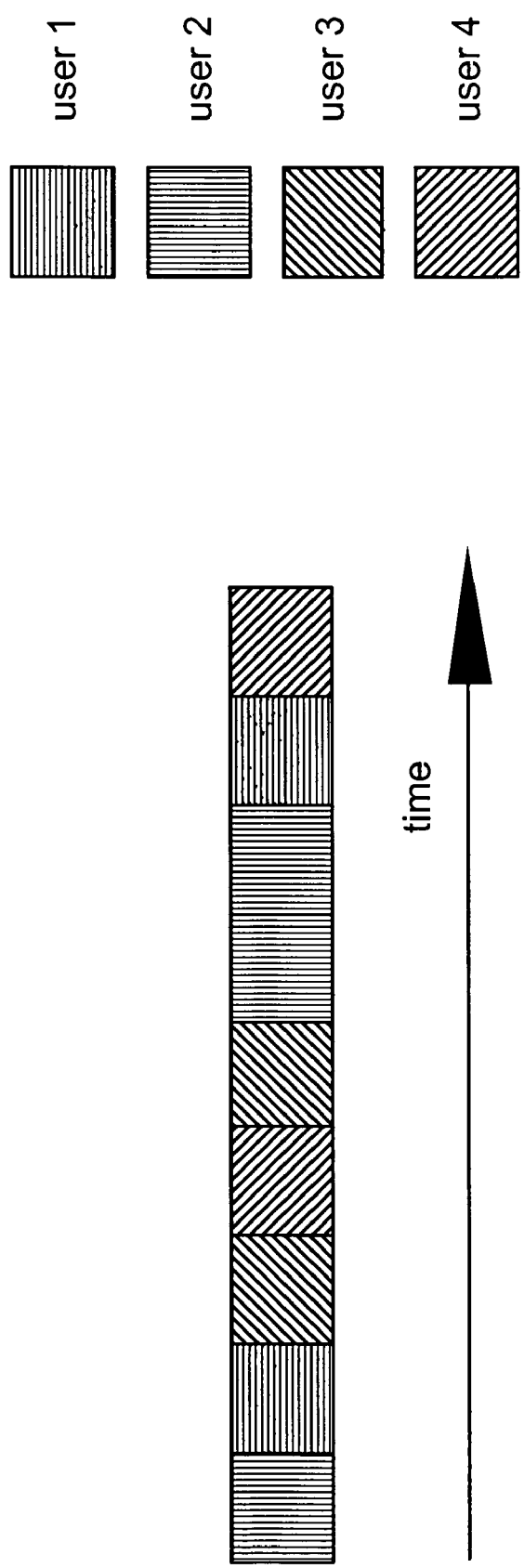
FIG. 1A illustrates an example of scheduled transmissions for multiple users.
Figure 1B:
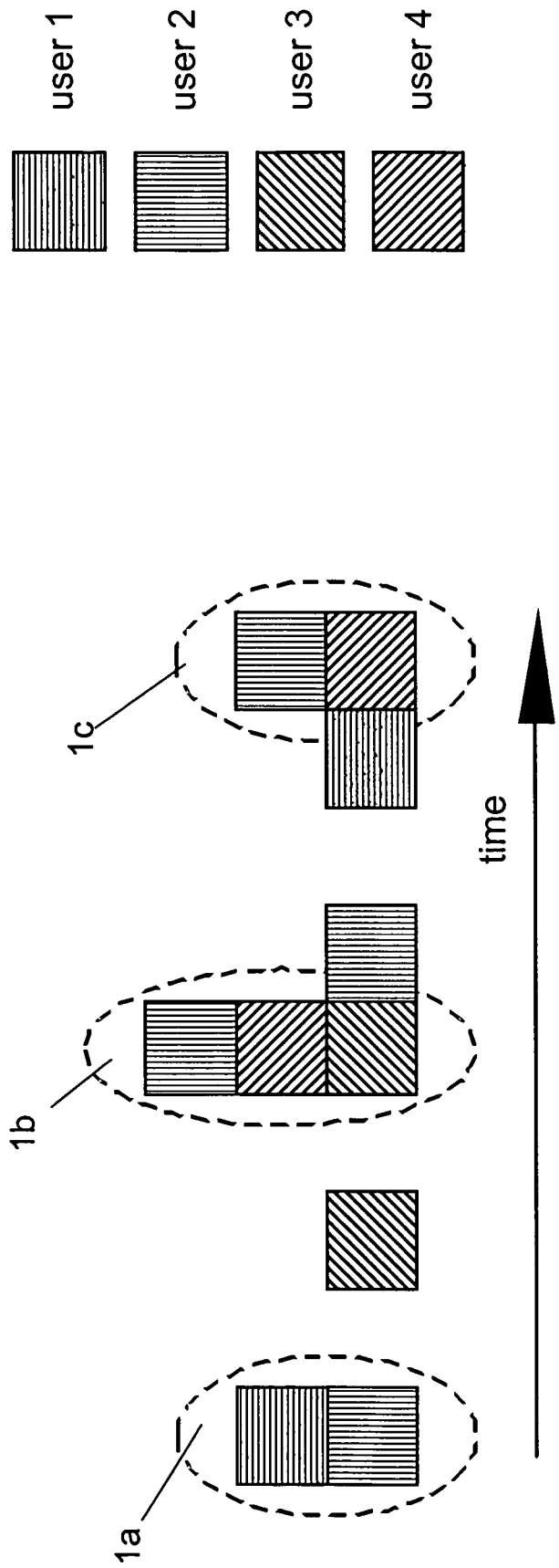
FIG. 1B illustrates an example of unscheduled transmissions for multiple users that can result in collisions.
Figure 2:
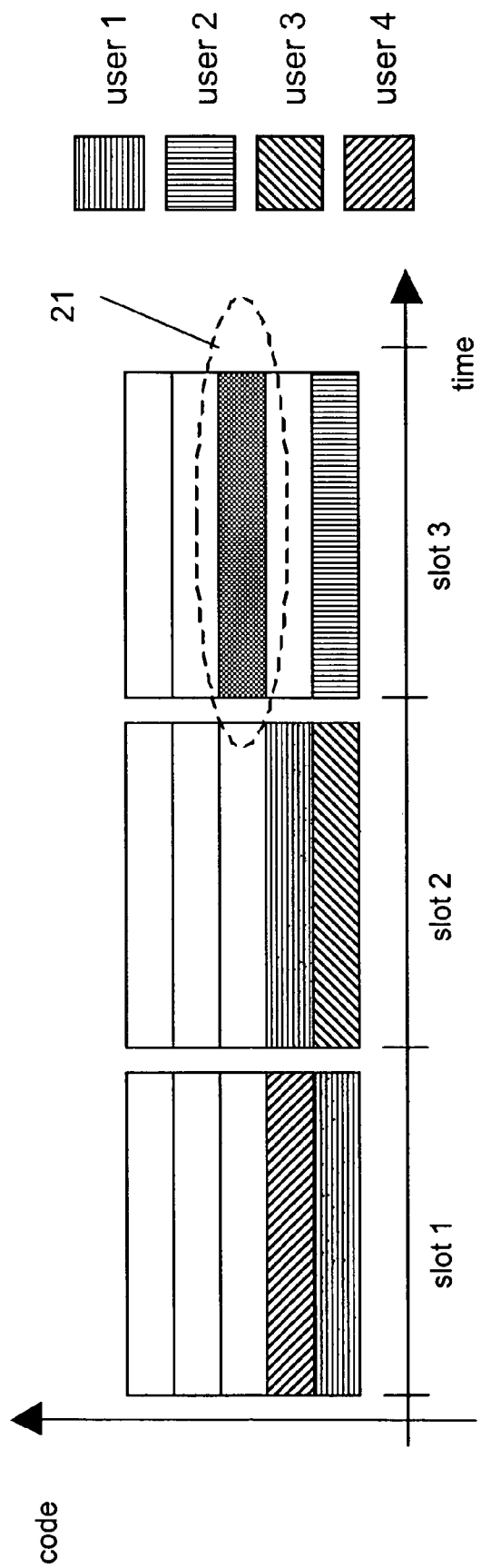
FIG. 2 illustrates a reduction of collisions for unscheduled transmissions using a combination of CDMA and TDMA multiplexing.
Figure 3:
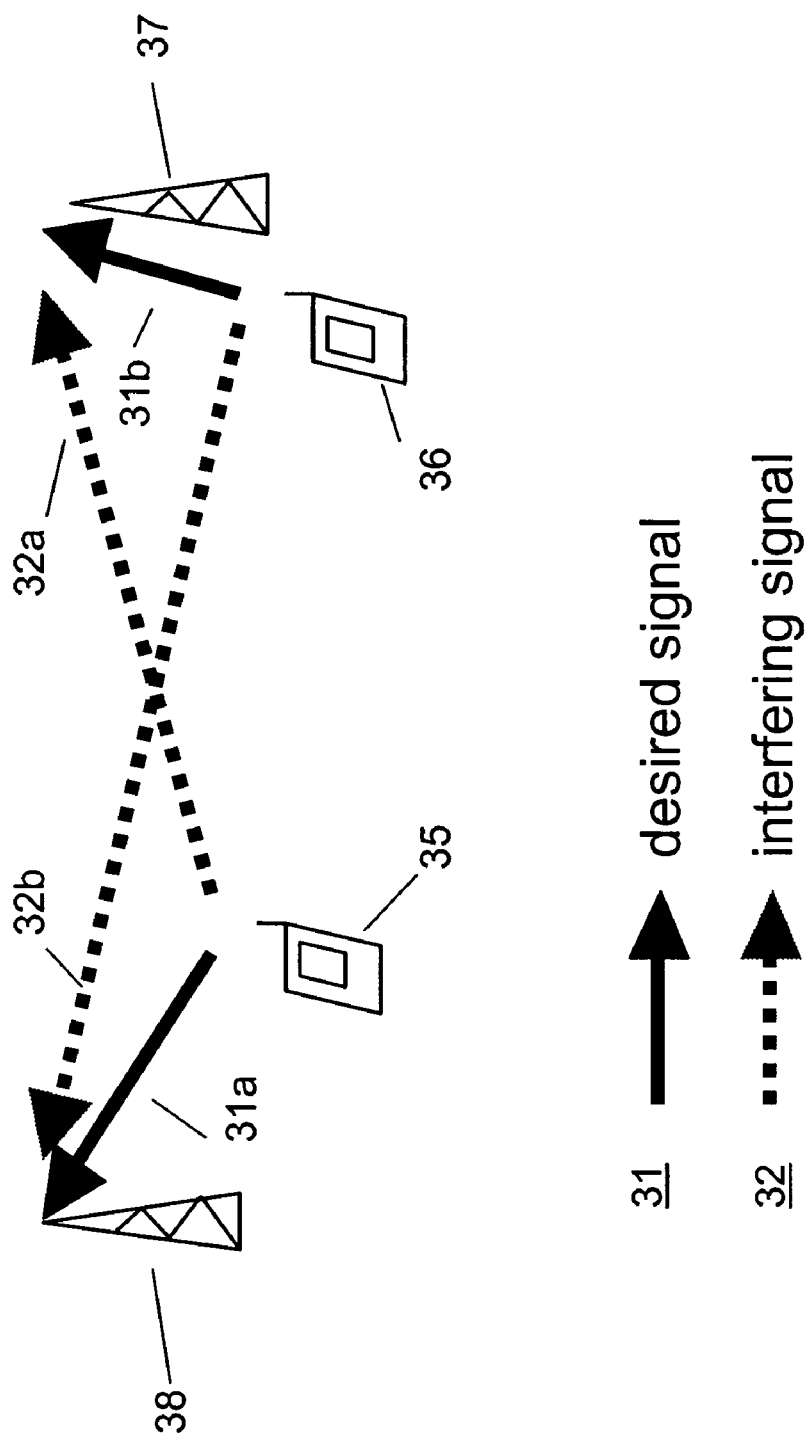
FIG. 3 illustrates an uplink intercell interference scenario with two base stations and two mobile stations.
Figure 4A:
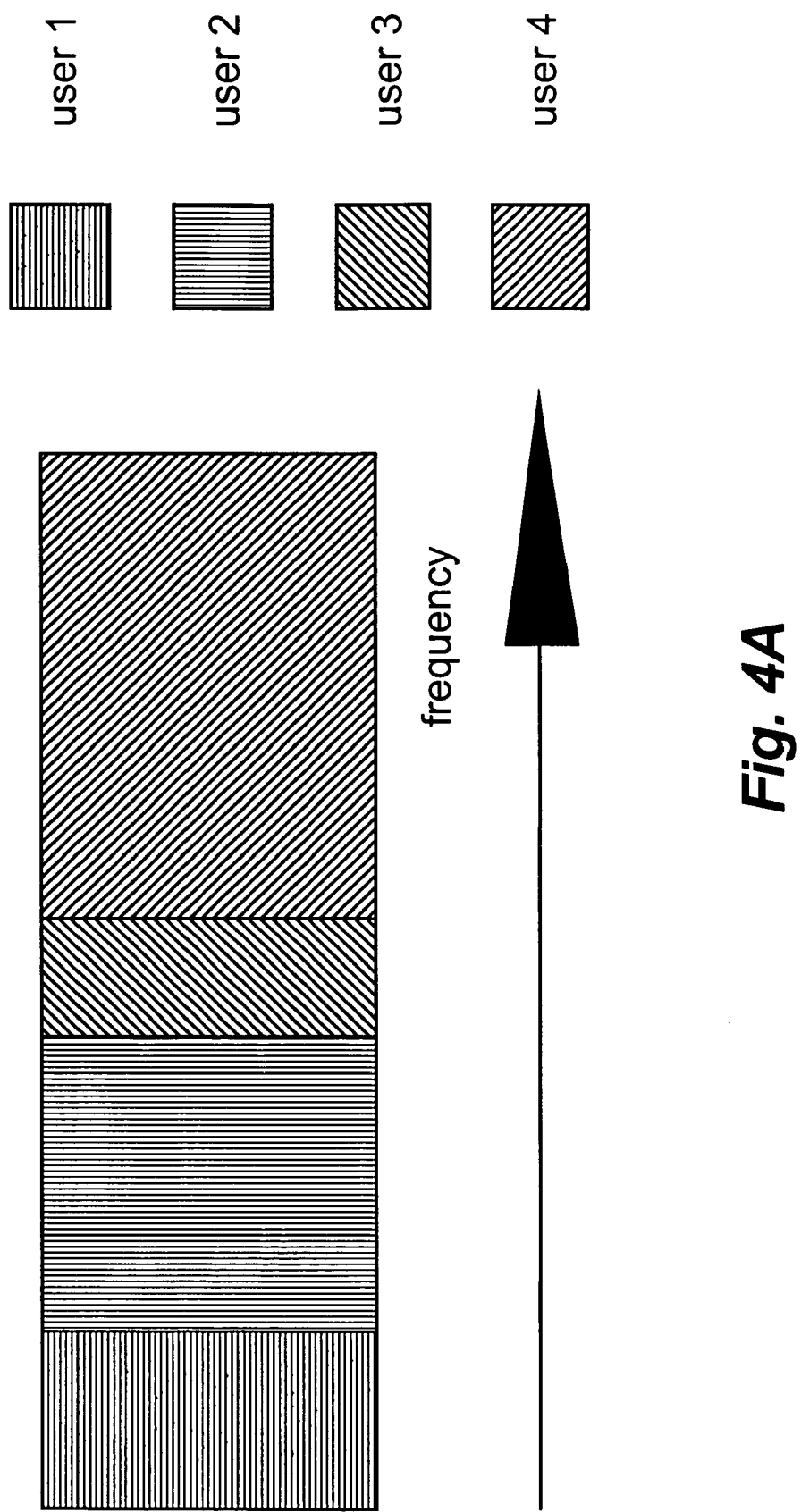
FIG. 4A illustrates an example of localized frequency domain transmission.
Figure 4B:
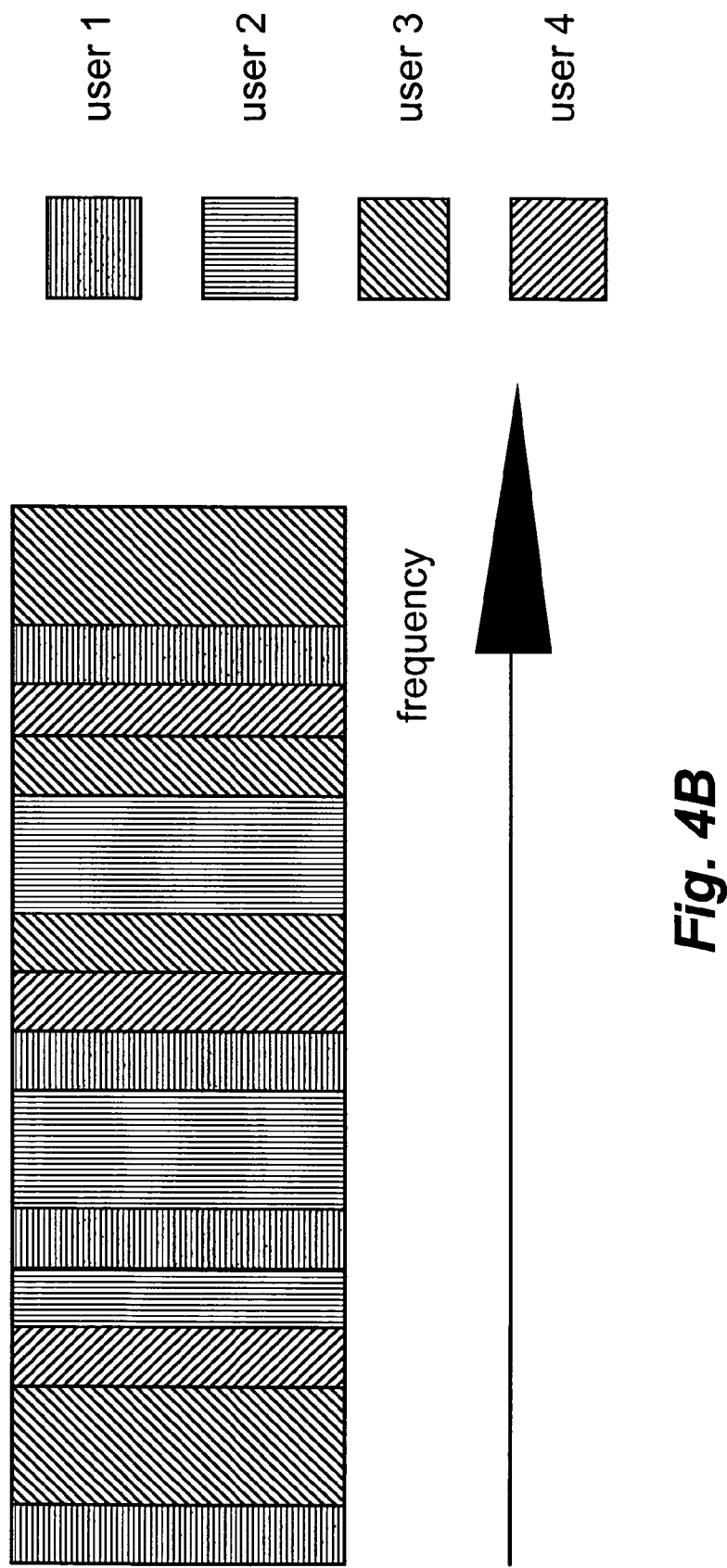
FIG. 4B illustrates an example of distributed frequency domain transmission.
Figure 5A:
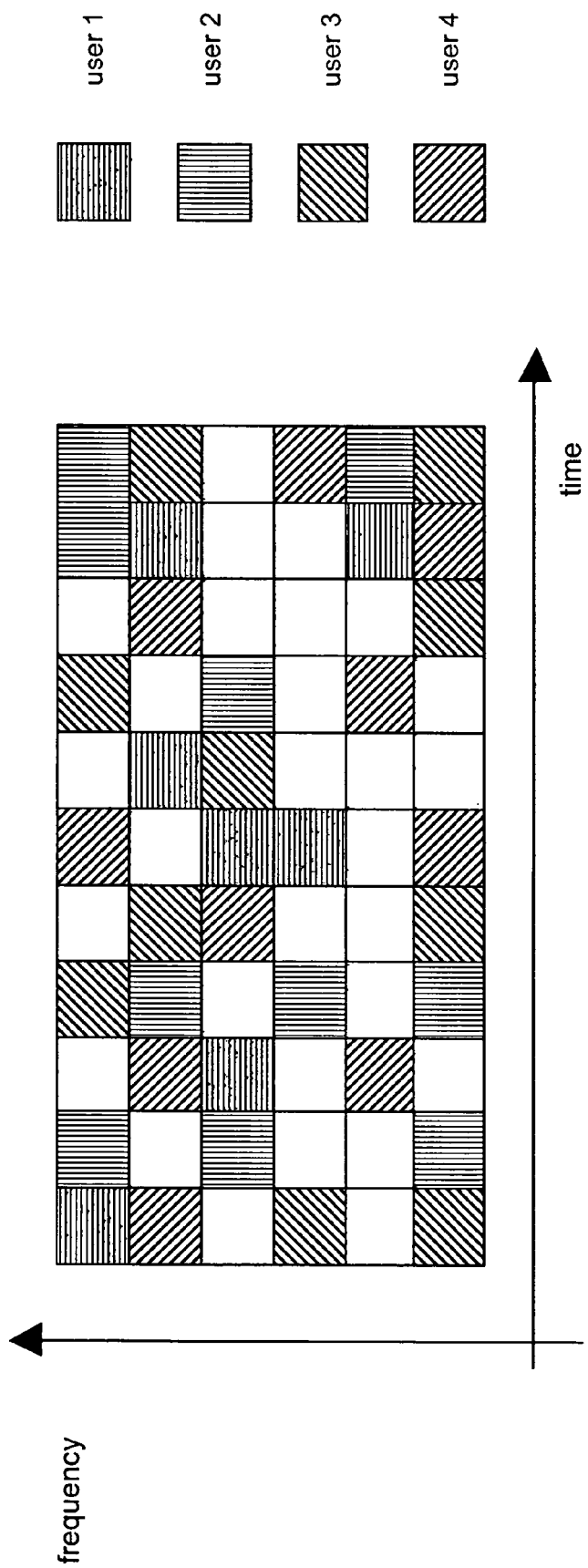
FIG. 5A illustrates time/frequency transmission resource space for distributed FDMA with a TDMA component.
Figure 5B:
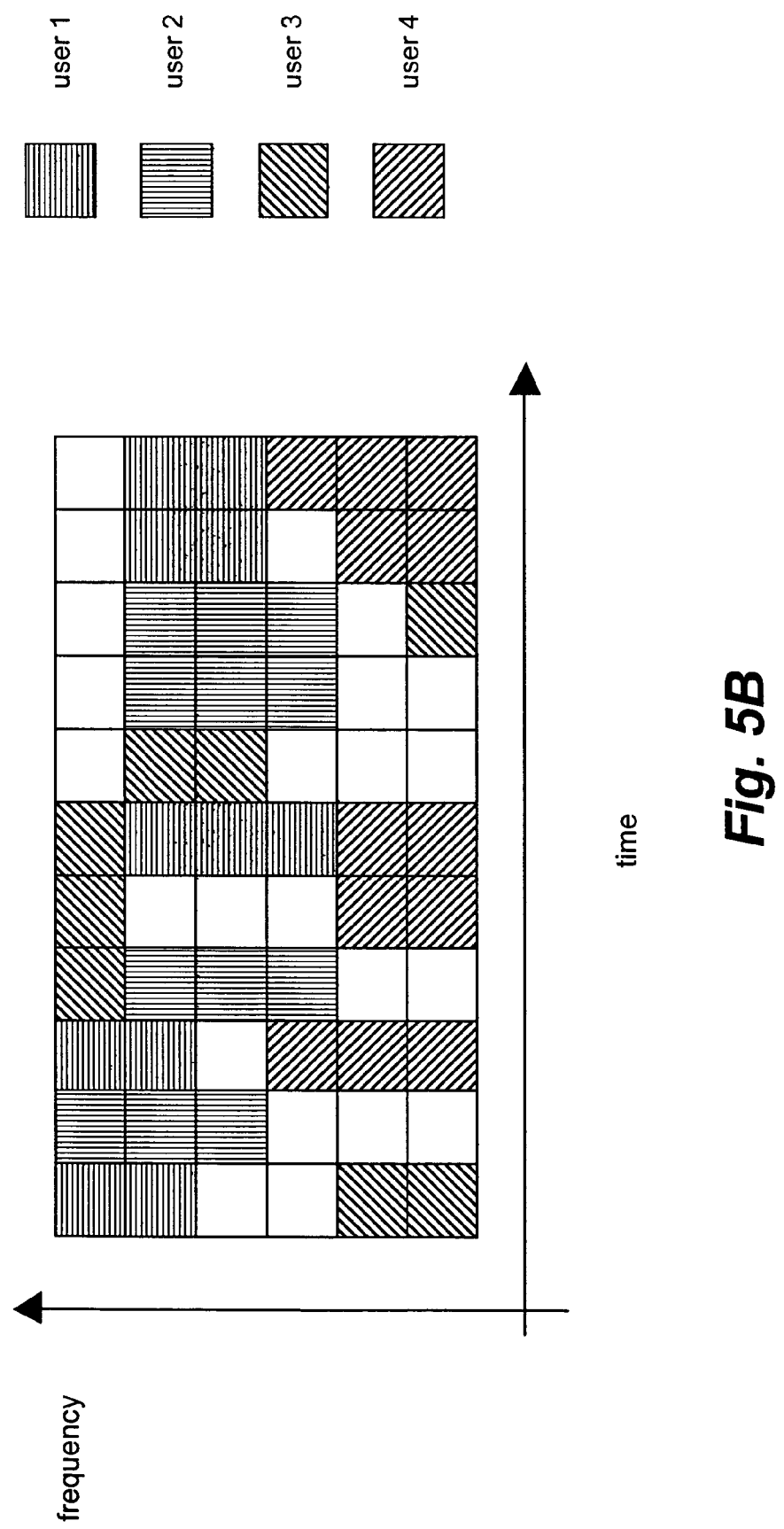
FIG. 5B illustrates time/frequency transmission resource space for localized FDMA with a TDMA component.
Figure 6A:
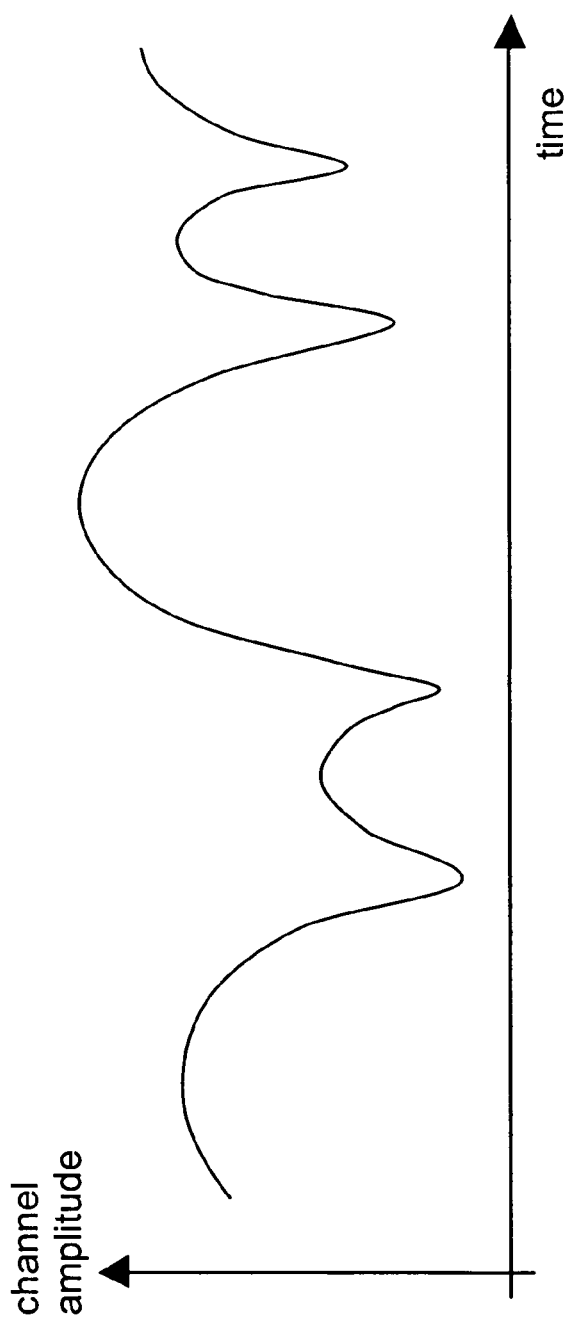
FIG. 6A is a plot of transmission channel gain versus time in a fading environment.
Figure 6B:
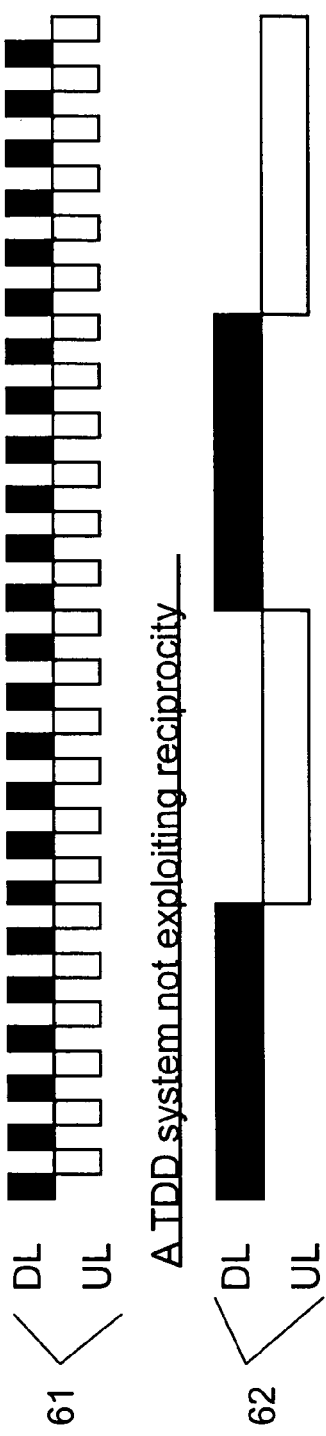
FIG. 6B is a plot comparing a TDD system that exploits channel reciprocity, with a TDD system that does not exploit channel reciprocity.

The rate of change of the channel path loss can increase as the speed of the mobile is increased, and hence the reciprocity principle is said to apply over a region of time termed the coherence time of the channel, which is short for high mobile speeds and high carrier frequencies and longer for lower mobile speeds and lower carrier frequencies. A well designed TDD radio system will ensure that the gaps between downlink and uplink transmission times are arranged such that for reasonable mobile speeds, some degree of channel reciprocity may be exploited. This is illustrated in FIGS. 6A and 6B. FIG. 6A illustrates a change in channel path loss as a function of time. FIG. 6B illustrates 61 a TDD system exploiting channel reciprocity by rapidly alternating uplink and downlink transmissions. FIG. 6B (item 62) illustrates a TDD system that fails to exploit channel reciprocity, because the uplink and downlink transmissions alternate too slowly.

Figure 7A:
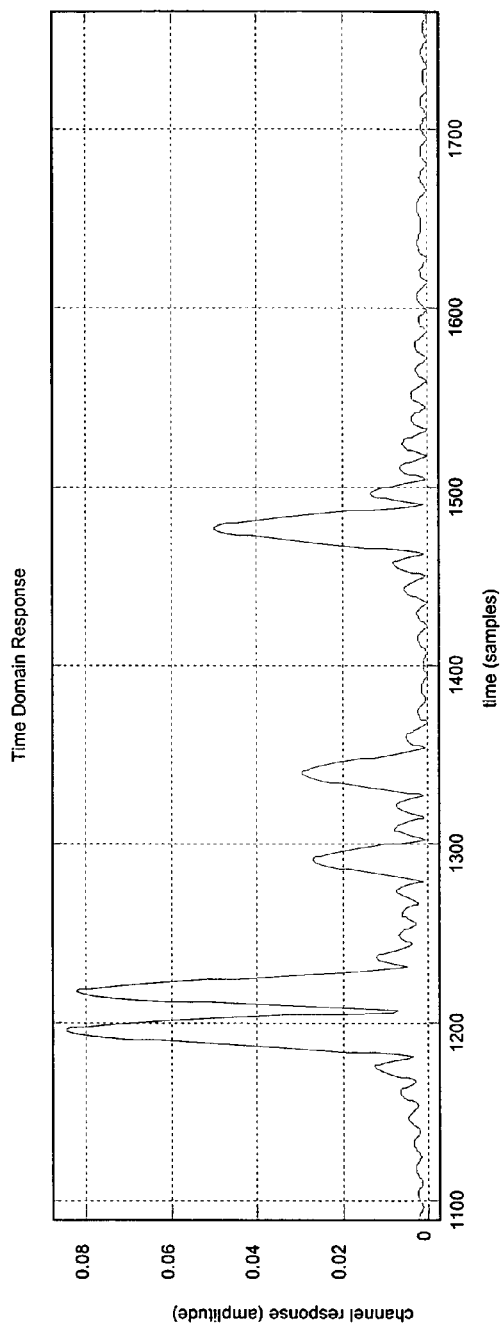
FIG. 7A is an exemplary plot of a time domain channel response.

A radio propagation channel may be described by its time-domain impulse response. This may be measured by transmitting a known reference signal across the system bandwidth (often called a midamble or pilot signal), and by comparing (in a receiver) this known transmitted signal to the received version which has passed through the channel to determine the radio channel characteristic, or (impulse response) such as shown in FIG. 7A.

In some embodiments, channel estimation in the receiver relies on the presence of reference signals within the transmitted signal. Using the received version of the transmitted reference signal, along with a-priori knowledge of the reference signal structure, the receiver can determine the time domain or frequency domain response of the channel through which the signal has passed.

In some embodiments, the frequency domain response of the radio channel through which the reference signal has passed is determined using a Fourier Transform of an impulse response of the radio channel as determined from a deconvolution of the received reference signal and the transmitted reference signal, or by other suitable processing of the received and transmitted reference signals, such as matched filtering or correlation with optional post-processing as are well known to one of ordinary skill in the art. In yet another embodiment, the frequency domain response of the radio channel through which the reference signal has passed is determined by comparing a power spectral density of the reference signal as received with a known power spectral density of the reference signal as transmitted.

According to additional embodiments, a receiver is capable of estimating a radio channel response without relying on reference signals. As illustrated in FIG. 10D, such receivers exploit knowledge of, for example, the finite alphabet of possible transmitted modulation symbols used for the data, or exploit the known structure of codes utilized in the encoding process at the transmitter (such as convolutional codes, block codes, turbo codes) 1014. These techniques can involve nonlinear or iterative signal processing techniques and are widely described in the open literature. For such embodiments, downlink reference signals need not be provided (or if they are provided, need not be used for purposes of channel response estimation), yet the receiver is still able to determine the time domain or frequency domain response of the channel based only on transmitted data (and not using reference signals). As such, the mobile terminal may still use the channel response information to select a set of preferred frequency transmission resources for unscheduled uplink transmissions, or to assist with setting of a transmission power level for the selected set of uplink resources.

As used herein with respect to signals, the term "structural aspect" means an aspect of a signal such as (i) a known sequence of modulation symbols, (ii) a transmitted power spectral density, and (iii) statistical signal aspects relating to the finite alphabet of possible transmitted modulation symbols and/or channel coding 1016.

Figure 7B:
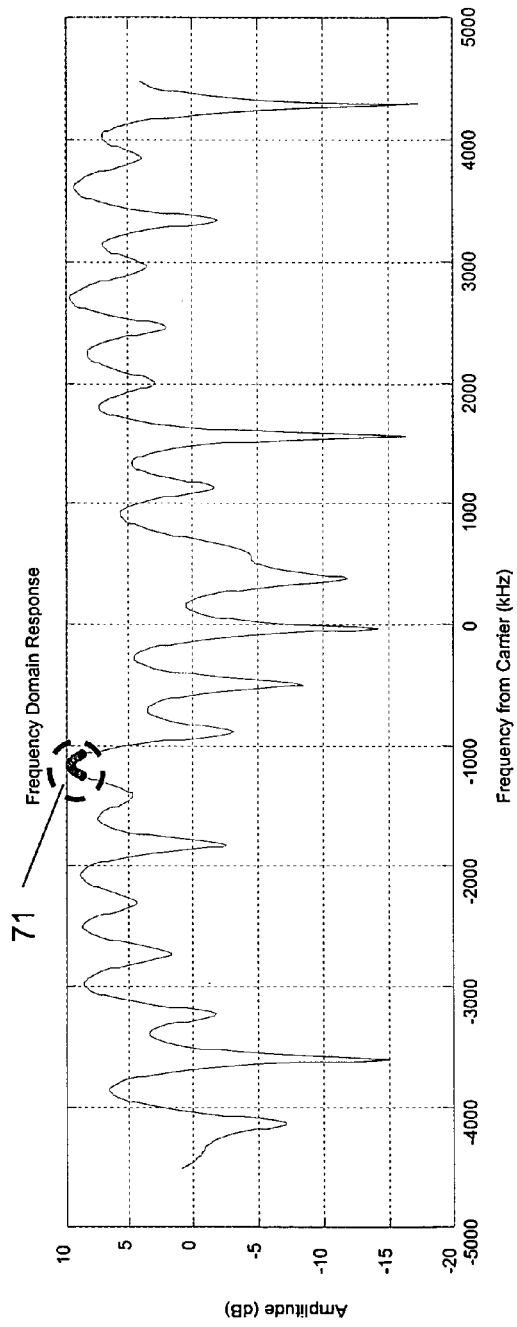
FIG. 7B is an exemplary plot of a frequency domain channel response, with an optimum range of contiguous frequencies indicated.

The channel may be equally well described in the frequency domain such as shown in FIG. 7B. The frequency response of the channel may be obtained by performing a Fourier transform on the time-domain impulse response, or by using direct frequency domain channel estimation methods. In reference to FIG. 7B, it is clear that some frequencies have less path loss than others (for example, item 71). Transmission on these "better" frequencies can improve the reception reliability for a given transmission power. Thus, for a fixed transmission power, the reception reliability may be improved. Conversely, for a fixed reception reliability, the transmitted power may be reduced.

It should be noted that a path gain metric for an uplink channel can be estimated from path loss estimates for downlink channels that do not exactly coincide the uplink channel's sub-range of frequencies, but are representative by using interpolation or extrapolation.

The technique of frequency domain scheduling is well known. In this technique, the basestation (or other network or controlling entity) tries to marry the allocated transmission resources with the set of best-performing frequencies at that time. It is usually the case that the channels for each user are de-correlated. Those frequencies which are good for one user are often not the best frequencies for another user and so a form of user diversity can be exploited. However, for unscheduled transmissions, there is no scheduling entity to make these decisions regarding which resources to allocate to a given user according to the channel response.

Figure 10A:
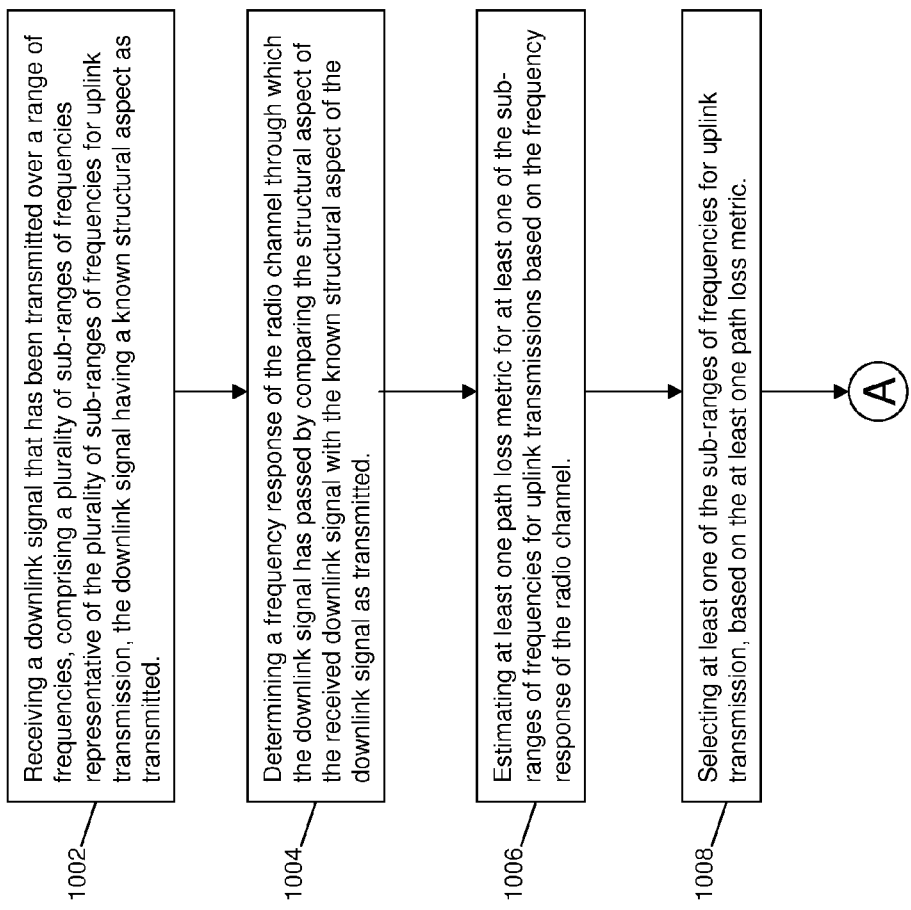
FIG. 10A is flowchart of a method of selecting, by a mobile terminal, a sub-range of frequencies for uplink transmission according to embodiments of the invention.
Figure 10B:
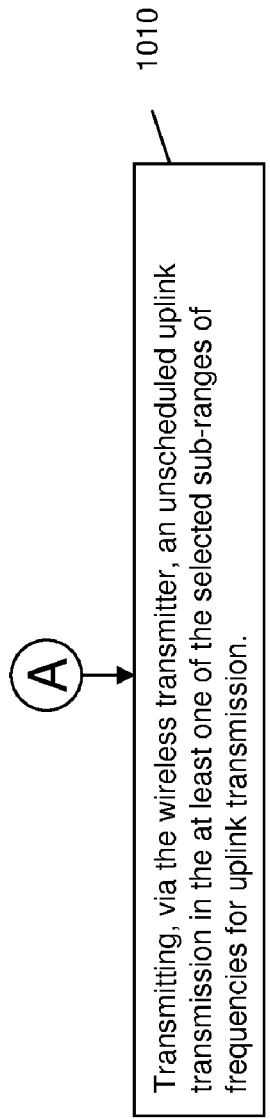
FIG. 10B is flowchart of a method of selecting, by a mobile terminal, a sub-range of frequencies for uplink transmission according to embodiments of the invention.
Figure 10C:
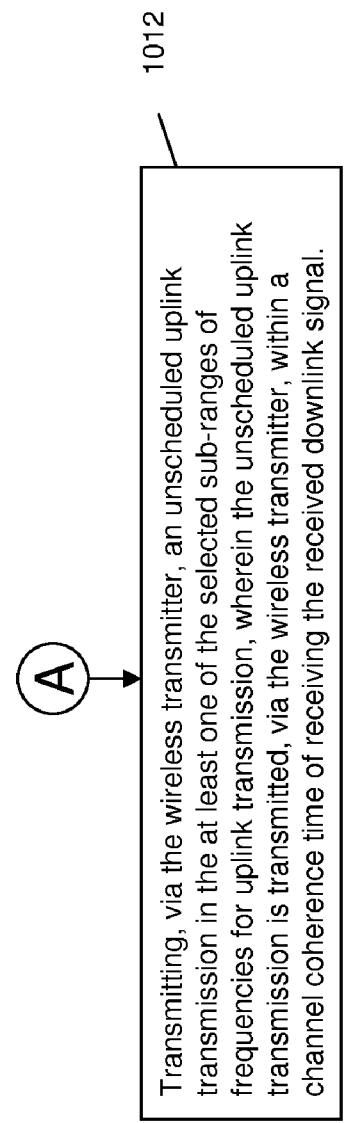
FIG. 10C is flowchart of a method of selecting, by a mobile terminal, a sub-range of frequencies for uplink transmission according to embodiments of the invention.
Figure 10D:
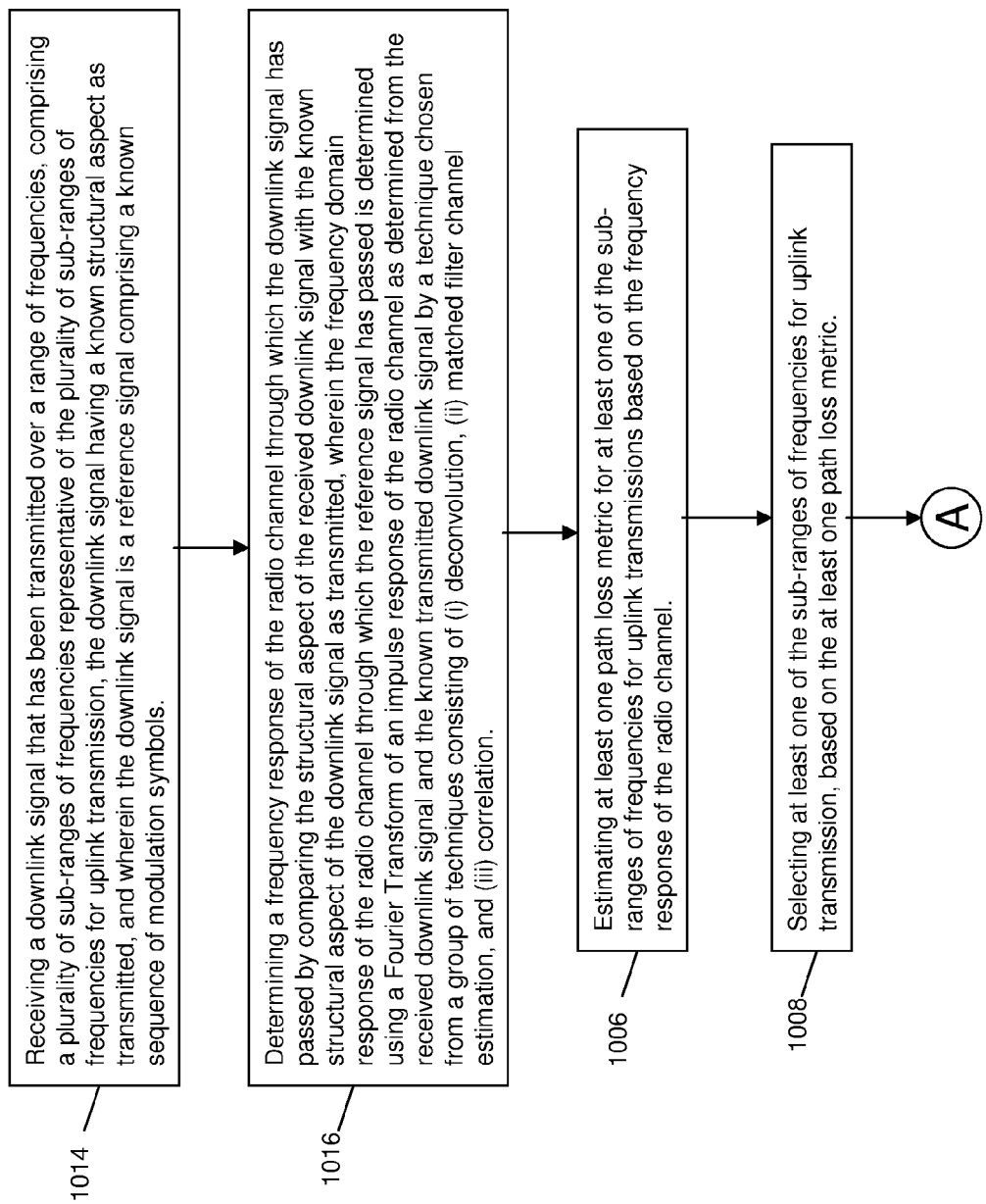
FIG. 10D is flowchart of a method of selecting, by a mobile terminal, a sub-range of frequencies for uplink transmission according to embodiments of the invention.
Figure 10E:
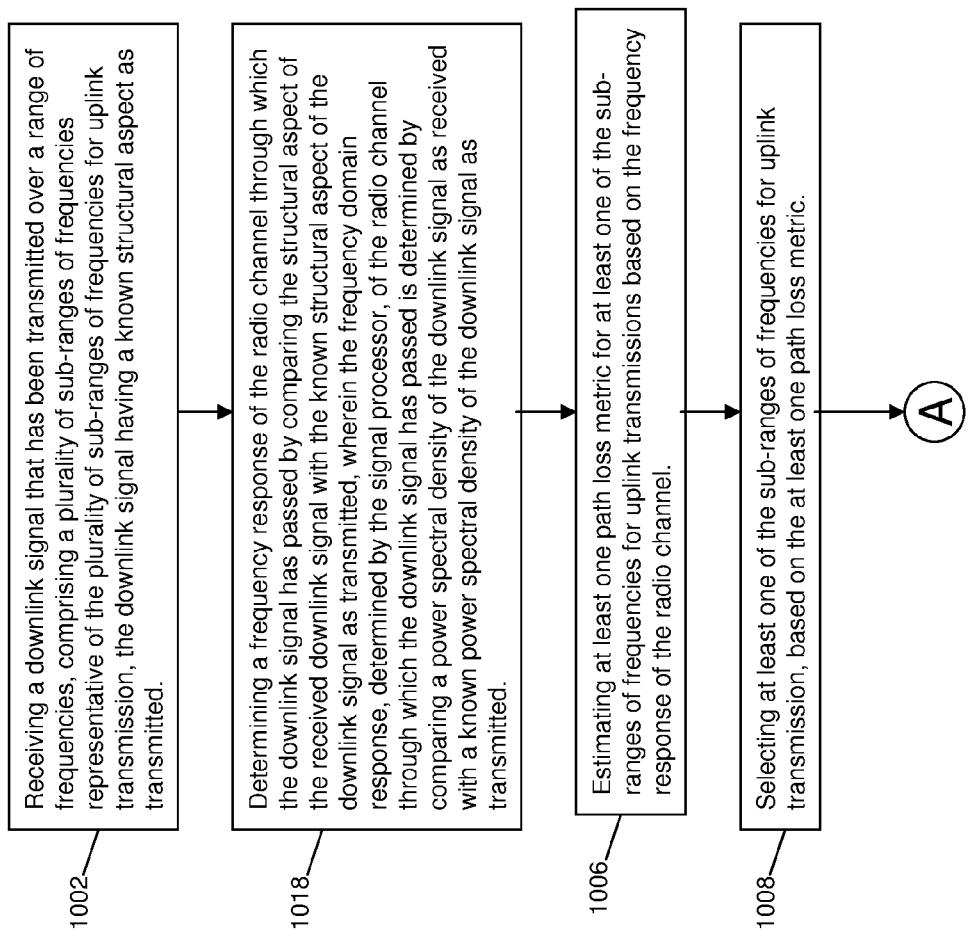
FIG. 10E is flowchart of a method of selecting, by a mobile terminal, a sub-range of frequencies for uplink transmission according to embodiments of the invention.
Figure 10F:
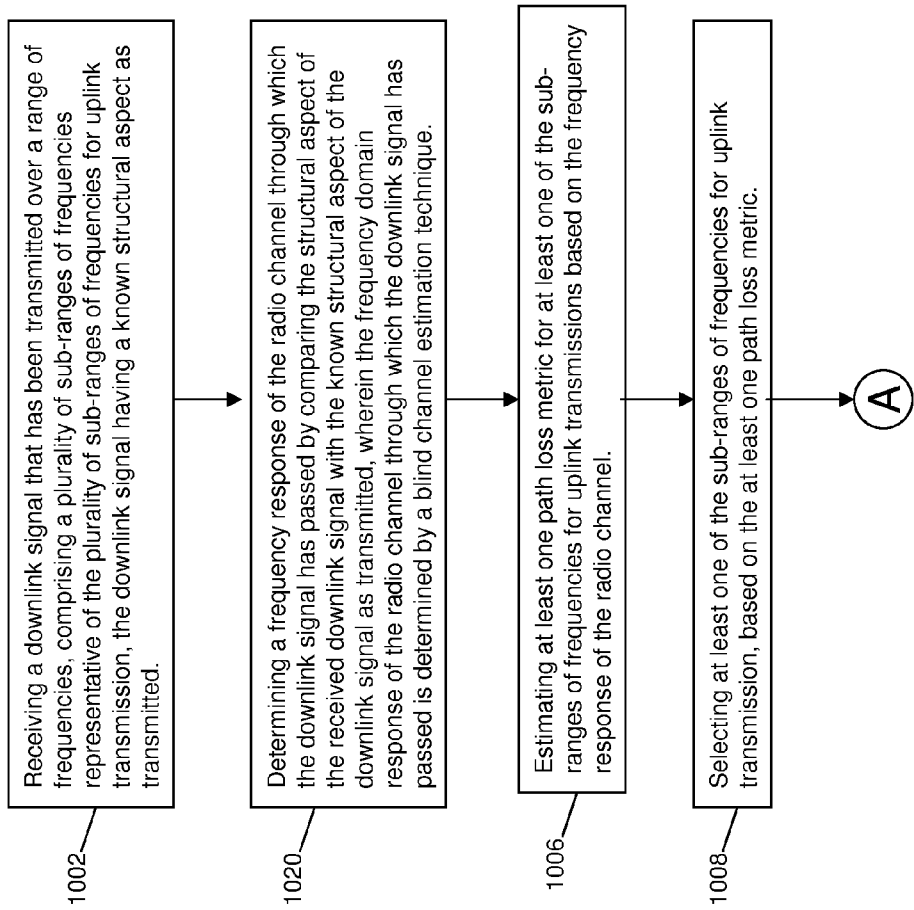
FIG. 10F is flowchart of a method of selecting, by a mobile terminal, a sub-range of frequencies for uplink transmission according to embodiments of the invention.

With reference to FIG. 10A, according to embodiments of the present invention, a mobile terminal measures the radio propagation channel response by receiving a (downlink) reference signal transmitted by a basestation (such as a pilot or midamble) 1002. The mobile terminal determines (for example, using, a Fourier Transform as described above) the frequency domain response of the channel and determines one or more uplink frequency resource sets, or any other structural aspect of the downlink signal, from a pre-defined list of uplink frequency resource sets 1004. Based on the frequency domain response, a path loss metric for at least one of the uplink frequency resource sets is estimated 1006. The sets having the lowest determined path loss are selected 1008. According to another embodiment of the invention, illustrated in FIG. 10E, the frequency domain response of the radio channel through which the reference signal has passed is determined by comparing a power spectral density of the reference signal as received, with a known power spectral density of the reference signal as transmitted 1018. The selected uplink transmission resource sets can be denoted the "preferred frequency resource sets." The mobile is not scheduled, but upon determining a need to communicate with the basestation, can make an unscheduled transmission for which it autonomously selects the uplink transmission frequency resources corresponding to the preferred frequency resource sets. With reference to FIG. 10B, according to embodiments of the invention the mobile transmits the an unscheduled uplink transmission in the at least one of the selected uplink frequency sets for uplink transmission 1010. Further, as shown in FIG. 10C, the uplink transmission may be transmitted within a channel coherence time of receiving the downlink reference signal 1012.

In still further embodiments, "blind" channel estimation techniques can be used to estimate channel impulse or frequency response.

Optionally, the transmission power of the uplink communication can be set, at least in part, based upon the determined path loss of the frequencies selected. In embodiments employing power control, the transmission power can be minimized for each transmission and consequently interference can also minimized and system capacity can be improved. It should be noted this in this instance, the probability of collision due to intra-cell transmissions is not affected/improved due to the fact that all transmissions will arrive at the receiver at approximately the same level and the number of transmitting users and the size of the resource space have not changed. However, an advantage is that the required transmit power to achieve a given communication reliability can be reduced, hence, the interference power released into other cells of the system is reduced. When applied system-wide, this can also bring benefits to a serving cell in that the observed interference power coming from out-of cell users is reduced and so the probability of correct detection of the transmitted data from intra-cell users (assuming they have not collided) is increased and uplink capacity is therefore also improved.

Figure 10G:
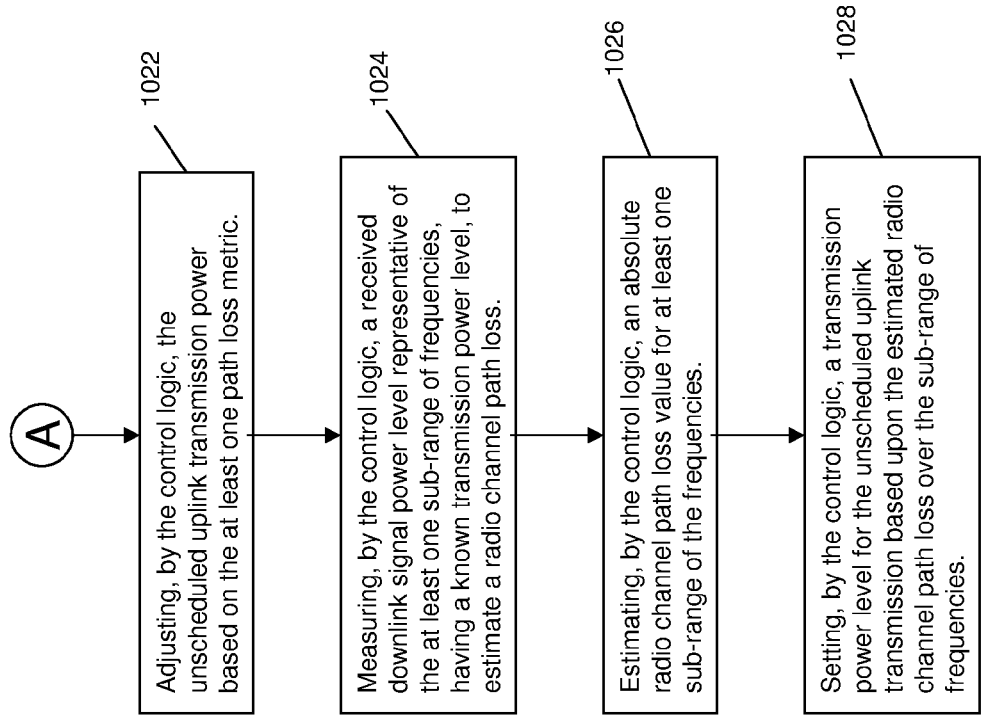
FIG. 10G is flowchart of a method of selecting, by a mobile terminal, a sub-range of frequencies for uplink transmission according to embodiments of the invention.

Other embodiments, as illustrated in FIG. 10G, further comprise adjusting the unscheduled uplink transmission power based on the at least one path loss metric 1022. Further, an absolute radio channel path loss value is estimated for at least one sub-range of the frequencies 1028, comprising measuring a received reference signal power level within the at least one sub-range of frequencies, having a known transmission power level, to estimate a radio channel path loss 1024; and sets a transmission power level for the unscheduled uplink transmission based upon the estimated radio channel path loss over the sub-range of frequencies 1026.

For embodiments that do not employ power control, the probability of erroneous detection of the transmitted data due to out-of-cell interference is still reduced even though the transmit power level remains the same as in the case where the frequency domain channel selection technique is not employed (for example, random selection, or distributed selection of the frequency resource sets). This is because without power control, the user's received power in the serving cell will be systematically improved when the UE selects only those frequencies with the lowest path loss to the basestation. Out-of-cell users transmitting on the same time/frequency resources in other cells are unlikely to see this same systematic improvement in received power at the first user's serving cell receiver. This is because the channel from the out-of-cell users to their serving cell is uncorrelated with the channel from the same out-of-cell users to a neighboring cell. Thus, when users select frequency channels that are good (i.e. have low path loss) in their serving cell, they are not necessarily selecting frequencies which have low path loss to neighboring cells, hence the ratio of the mean power received in their serving cell to the mean power received in neighboring cells is increased. This means for a given transmit power level, the amount of intercell interference generated is decreased and communication reliability in each cell is improved.

Thus, embodiments of the invention have advantages which may be exploited in slightly different ways, depending on whether power control is enabled or disabled.

Figure 8:
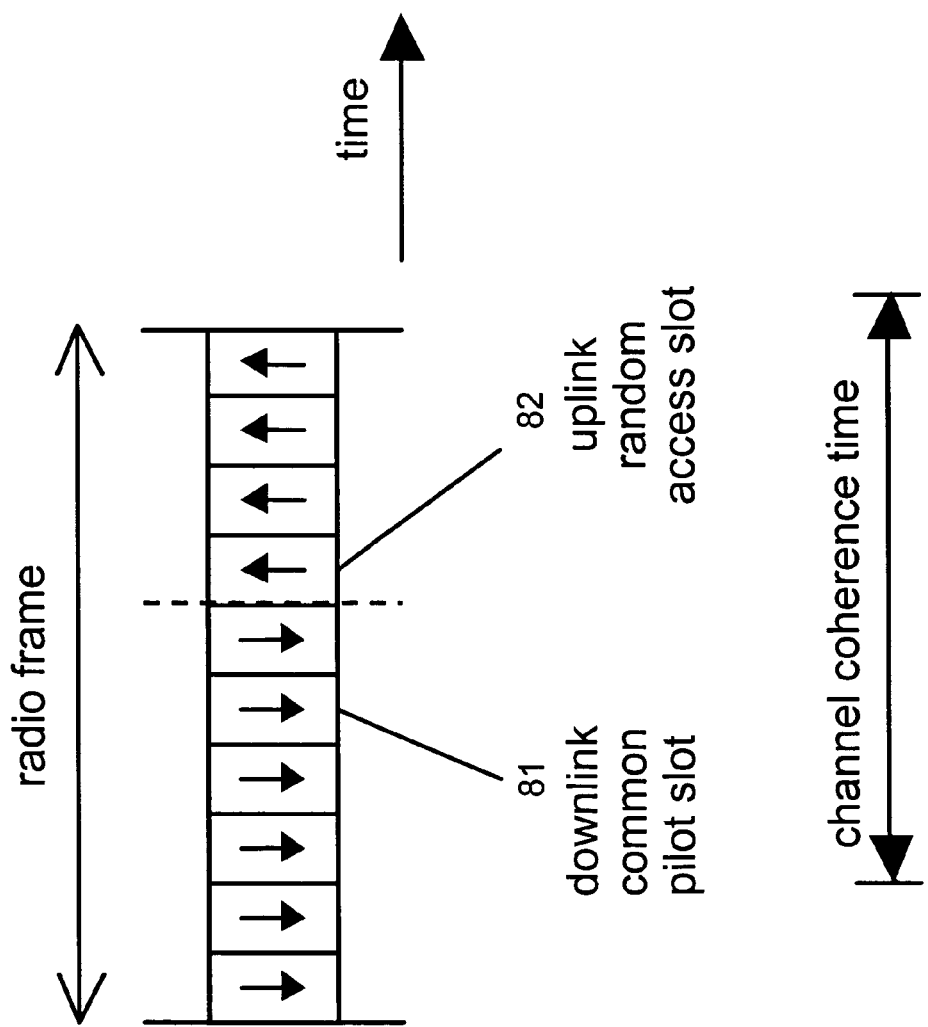
FIG. 8 is a radio frame structure according to an embodiment of the invention.

A Node-B (basestation) can transmit a known reference pilot signal on a downlink common channel. This can be termed a common pilot. The UE (mobile) has knowledge of the location and structure of this downlink common pilot within the radio frame and defined system transmission resources. The wireless system can use a radio framing structure such as illustrated in FIG. 8 in which some parts of the frame are designated as downlink and some designated as uplink, as indicated by the down and up vertical arrows, respectively. This is a TDD radio communications system. The frame can be further decomposed into smaller time periods denoted "slots" here. The common pilot 81 is transmitted a short time before a portion of the radio frame set aside for random access (or other non-scheduled) uplink transmissions 82. Advantageously, the period of time between the common downlink pilot and the uplink non-scheduled transmission slot is short and within the coherence time of the channel, thus the reciprocity of the downlink and uplink radio channels is preserved (see FIG. 8).

The uplink radio access technology is based at least in part upon FDMA. Random access resources (or equivalently, uplink resources set aside for non-scheduled transmissions) are pre-defined and segmented into a set of transmission channels (or equivalently, sub-ranges of frequencies). A UE may select one or more of the pre-defined uplink transmission channels for unscheduled transmission usage.

A Node-B receiver can be similarly configured with knowledge of the set of pre-defined uplink transmission channels and listens to incoming transmissions on each of these defined channels during each period of the frame set aside for non-scheduled or random access transmission.

The transmission channels may conform to a localized FDMA model, or to a distributed FDMA model as described above, although due to the usual presence of some degree of correlation across neighboring frequencies, localized FDMA may be an advantageous configuration.

On determining a need to transmit an unscheduled transmission, the UE actively receives the next available downlink common pilot slot, or another downlink pilot slot that exists a short period of time prior to the targeted slot for unscheduled uplink transmission. Using the received signal and the pre-configured knowledge of the structure of the pilot signal, the UE determines the frequency domain channel response. This is achieved either via estimation of the time-domain channel impulse response with a subsequent Fourier transform, or via direct frequency domain channel estimation in which the mobile terminal (UE) has knowledge of the frequency domain structure of the transmitted pilot.

The UE analyses the frequency domain response of the channel and forms a metric for each of the pre-defined uplink transmission channels. For each uplink transmission channel considered, the metric can be based upon the amplitude of the channel response for the frequencies occupied by that uplink transmission channel. A higher amplitude response (i.e. lower path loss) results in a higher (better) metric value.

The metrics for each of the considered uplink transmission channels are compared and one or more with the highest metrics are selected.

The UE performs an unscheduled transmission using the selected uplink transmission channel(s). The transmit power of the signal can be determined based upon knowledge of the absolute path loss of the radio channel over the frequencies occupied by the selected uplink transmission channel(s). Knowledge of the absolute path loss may be obtained in the usual manner by informing the UE of the transmitted power of the downlink reference signal (pilot).

The Node-B can search for unscheduled transmissions during the random access/unscheduled access portions of the frame, and attempt to decode a UE signal, if received.

Figure 9:
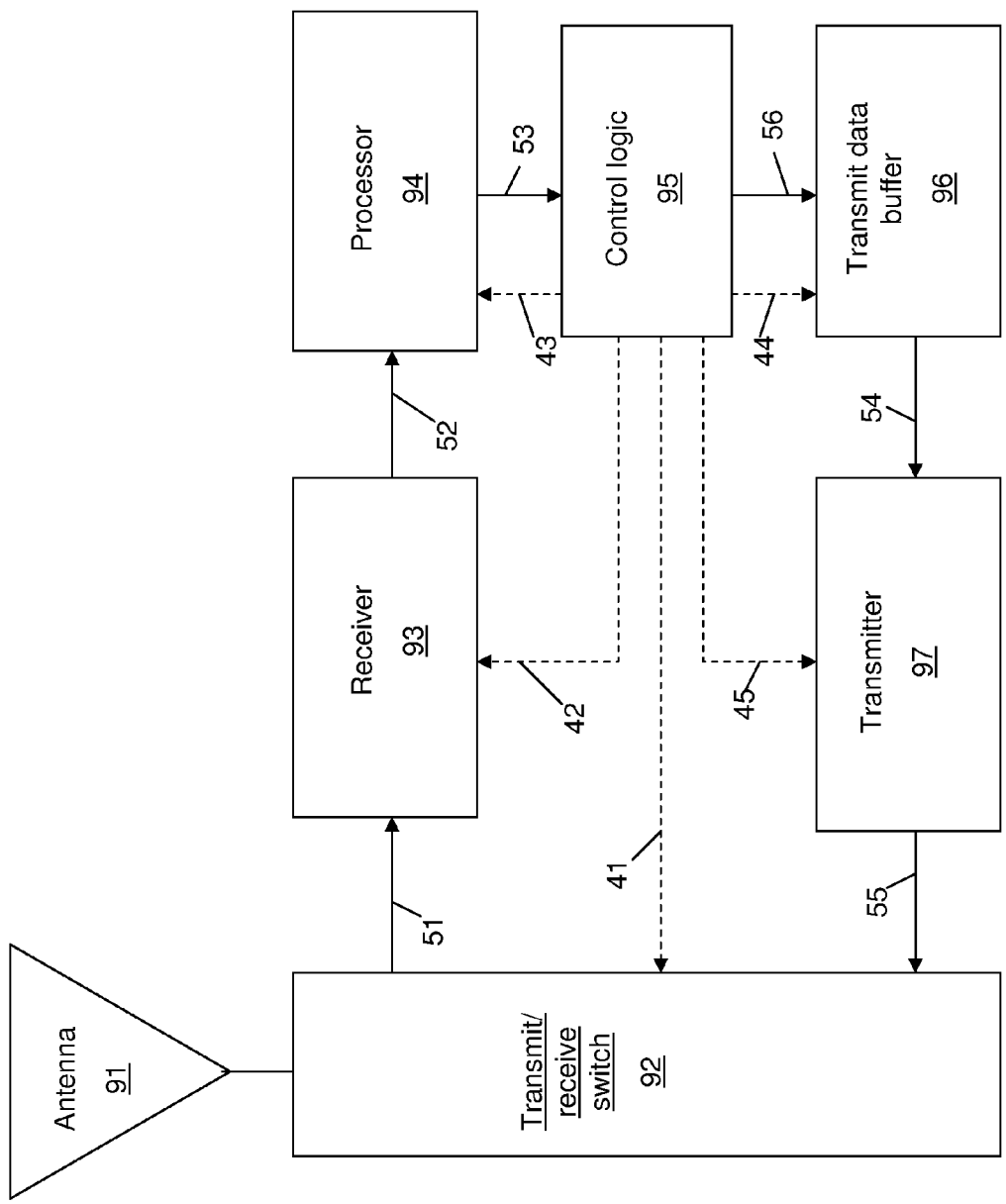
FIG. 9 is a block diagram of a mobile terminal according to an embodiment of the invention.

FIG. 9 is a block diagram of a mobile terminal (or UE) according to one embodiment of the invention. Antenna 91, used for both transmission and reception is coupled to transmit/receive switch 92. Responsive to control logic 95 via control path 41, T/R switch 92 can couple antenna 91 to either receiver 93 via signal path 51, or to transmitter 97 via signal path 55, for reception or transmission, respectively. Receiver 93 can comprise RF filtering, RF amplification, one or more mixers and associated local oscillators or frequency synthesizers for frequency conversion, IF filtering, and analog to digital conversion. Receiver 93 is shown being controlled by control logic 95 via control path 42. Such control can include local oscillator frequencies, power up/down, and gain or attenuation. The output of receiver 93 can be digital and is transferred to signal processor 94 via signal path 52. Digital signal processor 94 can perform operations including, for example without exclusion, demodulation, detection, deconvolution, convolution, Inverse Fast Fourier Transforms, Fourier Transforms, filtering, spectrum estimation, under control of control logic 95 via control path 43. An output of signal processor 94 can be communicated to control logic 95 via signal path 53, for additional processing or to determine control program branching. Control logic 95 can have both control and signal inputs to transmit data buffer 96, that stores data for transmission by transmitter 97. Such data can originate locally, from a source not shown, or from control logic 95. Transmitter 97 can comprise digital to analog converters, modulators, IF and RF filters, mixers, local oscillators or synthesizers, gain control blocks, and amplifiers. Variations on this block diagram are obvious to one of ordinary skill in the art. For example, transmitter 97 and receiver 93 can share common local oscillators or frequency synthesizers. For another example digital signal processor 94, control logic 95, and transmit buffer 96 can be implemented a one single or dual processor core on a CMOS integrated circuit. For yet another example, control paths 41, 42, 43, 44, and 45 may be implemented as one or more control buses. Control logic 95 can control the operations of the mobile terminal, as well as process data from signal processor 94. The method embodiments described herein can be executed by control logic 95. Not shown, but associated with control logic 95 and/or digital signal processor can be both volatile and/or nonvolatile memory, serving as a computer-readable medium for storing computer-executable instructions and/or data.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual step in a method claim does not imply that the steps must be performed in this order. Rather, the steps may be performed in any suitable order.

The figures provided are merely representational and may not be drawn to scale. Certain proportions thereof may be exaggerated, while others may be minimized. The figures are intended to illustrate various implementations of the invention that can be understood and appropriately carried out by those of ordinary skill in the art.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

The invention claimed is:

1. A method of selecting, by a mobile terminal, including a wireless receiver, a signal processor, control logic, and a wireless transmitter, in a TDD wireless communication system, a sub-range of frequencies for uplink transmission from a plurality of sub-ranges of frequencies for uplink transmission, comprising:

receiving, via the wireless receiver, a downlink signal that has been transmitted over a range of frequencies, comprising a plurality of sub-ranges of frequencies representative of the plurality of sub-ranges of frequencies for uplink transmission, the downlink signal having a known structural aspect as transmitted;

determining, by the signal processor, a frequency response of the radio channel through which the downlink signal has passed by comparing the structural aspect of the received downlink signal with the known structural aspect of the downlink signal as transmitted;

estimating, by the control logic, at least one path loss metric for at least one of the sub-ranges of frequencies for uplink transmissions based on the frequency response of the radio channel; and selecting, by the control logic, at least one of the sub-ranges of frequencies for uplink transmission, based on the at least one path loss metric.

2. The method of claim 1, further comprising transmitting, via the wireless transmitter, an unscheduled uplink transmission in the at least one of the selected sub-ranges of frequencies for uplink transmission.

3. The method of claim 2, wherein the unscheduled uplink transmission is transmitted, via the wireless transmitter, within a channel coherence time of receiving the received downlink signal.

4. The method of claim 1, wherein the downlink signal, received via the wireless receiver, is a reference signal comprising a known sequence of modulation symbols, and wherein the frequency domain response, determined by the signal processor, of the radio channel through which the reference signal has passed is determined using a Fourier Transform of an impulse response of the radio channel as determined from the received downlink signal and the known transmitted downlink signal by a technique chosen from a group of techniques consisting of (i) deconvolution, (ii) matched filter channel estimation, and (iii) correlation.

5. The method of claim 1, wherein the frequency domain response, determined by the signal processor, of the radio channel through which the downlink signal has passed is determined by comparing a power spectral density of the downlink signal as received with a known power spectral density of the downlink signal as transmitted.

6. The method of claim 1, wherein the frequency domain response, determined by the signal processor, of the radio channel through which the downlink signal has passed is determined by a blind channel estimation technique.

7. The method of claim 1, further comprising adjusting, by the control logic, the unscheduled uplink transmission power based on the at least one path loss metric.

8. The method of claim 7, further comprising estimating by the control logic, an absolute radio channel path loss value for at least one sub-range of the frequencies, comprising:

measuring, by the control logic, a received downlink signal power level representative of the at least one sub-range of frequencies, having a known transmission power level, to estimate a radio channel path loss; and setting, by the control logic, a transmission power level for the unscheduled uplink transmission based upon the estimated radio channel path loss over the sub-range of frequencies.

9. A computer-readable medium encoded with computer-executable instructions for performing a method of selecting, by a mobile terminal in a TDD wireless communication system, a sub-range of frequencies for uplink transmission from a plurality of sub-ranges of frequencies for uplink transmission, wherein the instructions are executable by a processor, the computer-executable instructions comprising instructions for:

receiving a downlink signal that has been transmitted over a range of frequencies, comprising a plurality of sub-ranges of frequencies representative of the plurality of sub-ranges of frequencies for uplink transmission, the downlink signal having a known structural aspect as transmitted;

determining a frequency response of the radio channel through which the downlink signal has passed by comparing the structural aspect of the received downlink signal with the known structural aspect of the downlink signal as transmitted;

estimating at least one path loss metric for at least one of the sub-ranges of frequencies for uplink transmissions based on the frequency response of the radio channel; and selecting at least one of the sub-ranges of frequencies for uplink transmission, based on the at least one path loss metric.

10. The computer-readable medium of claim 9, further comprising computer-executable instructions for transmitting an unscheduled uplink transmission in the at least one of the selected sub-ranges of frequencies for uplink transmission.

11. The computer-readable medium of claim 9, further comprising computer-executable instructions for the transmission of the unscheduled uplink transmission within a channel coherence time of receiving the received downlink signal.

12. The computer-readable medium of claim 9, wherein the downlink signal is a reference signal comprising a known sequence of modulation symbols, further comprising computer-executable instructions to determine the frequency domain response of the radio channel through which the reference signal has passed using a Fourier Transform of an impulse response of the radio channel as determined from the received reference signal and the known transmitted reference signal by a technique chosen from a group of techniques consisting of (i) deconvolution, (ii) matched filter channel estimation, and (iii) correlation.

13. The computer-readable medium of claim 9, further comprising computer-executable instructions to determine the frequency domain response of the radio channel through which the downlink signal has passed by comparing a power spectral density of the downlink signal as received with a known power spectral density of the downlink signal as transmitted.

14. The computer-readable medium of claim 9, further comprising computer- executable instructions to determine the frequency domain response of the radio channel through which the downlink signal has passed is determined by a blind channel estimation technique.

15. The computer-readable medium of claim 9, further comprising computer- executable instructions to adjust the unscheduled uplink transmission power based on the at least one path loss metric.

16. The computer-readable medium of claim 15, further comprising computer-executable instructions for estimating an absolute radio channel path loss value for at least one sub-range of the frequencies, comprising: measuring a received downlink signal power level representative of the at least one sub-range of frequencies, having a known transmission power level, to estimate a radio channel path loss; and setting a transmission power level for the unscheduled uplink transmission based upon the estimated radio channel path loss over the sub-range of frequencies.

17. A mobile terminal for a TDD wireless communication system, capable of selecting a sub-range of frequencies for uplink transmission from a plurality of sub-ranges of frequencies for uplink transmission, comprising:

a wireless receiver capable of receiving a downlink signal that has been transmitted over a range of frequencies, comprising a plurality of sub-ranges of frequencies representative of a plurality of sub-ranges of frequencies for uplink transmission uplink transmission resources, the downlink signal having a known structural aspect as transmitted;

a signal processor to determine a frequency domain response of the radio channel through which the downlink signal has passed by comparing the structural aspect of the received downlink signal with the known structural aspect of the reference signal as transmitted; and control logic to estimate a path loss metric for at least one of the sub-ranges of frequencies based on the frequency domain response of the radio channel to select at least one of the sub-ranges of frequencies for uplink transmission, based on the at least one path loss metric.

18. The mobile terminal of claim 17, further comprising a wireless transmitter operative to transmit an unscheduled uplink transmission in the at least one of the sub-ranges of frequencies for uplink transmission.

19. The mobile terminal of claim 18, in which the wireless transmitter is further operative to transmit an unscheduled uplink signal within a channel coherence time of the received downlink signal.

20. The mobile terminal of claim 17, further comprising a signal processor operative to calculate by deconvolution an impulse response of the radio channel using the received downlink signal and the downlink signal as known to be transmitted, and subsequently perform a Fourier Transform to calculate the frequency response of the radio channel.

21. The mobile terminal of claim 17, further comprising a signal processor operative to determine a frequency domain response of the radio channel through which the downlink signal has passed is determined by comparing a power spectral density of the downlink signal as received with a known power spectral density of the downlink signal as transmitted.

22. The mobile terminal of claim 18, further comprising control logic operative to adjust the unscheduled uplink transmission power based on the at least one path loss metric.

23. The mobile terminal of claim 22, further comprising control logic operative to estimate an absolute radio channel path loss value for at least one sub-range of the frequencies by measuring a received reference signal power level within the at least one sub-range of frequencies, having a known transmission power level, to estimate a radio channel path loss; and setting a transmission power level for the unscheduled uplink transmission based upon the estimated radio channel path loss over the sub-range of frequencies.

* * * * *

UNITED STATES PATENT AND TRADEMARK OFFICE
CERTIFICATE OF CORRECTION

| | | |
|---|---|---|
| PATENT NO. | : 7,620,367 B2 | Page 1 of 1 |
| APPLICATION NO. | : 11/263044 | |
| DATED | : November 17, 2009 | |
| INVENTOR(S) | : Nicholas William Anderson | |

It is certified that error appears in the above-identified patent and that said Letters Patent is hereby corrected as shown below:

IN THE CLAIMS:

Column 12, Claim 8, Line 61; change "estimating" to -- estimating, --;

Column 13, Claim 14, Line 60; change "computer- executable" to -- computer executable --;

Column 13, Claim 15, Line 65; change "computer- executable" to -- computer executable --.

Signed and Sealed this

Sixth Day of April, 2010

David J. Kappos
*Director of the United States Patent and Trademark Office*